April 25, 1961  J. L. ZERBE, SR  2,981,553
AUTOMATIC TRUCK FLAP SYSTEM
Filed June 30, 1959
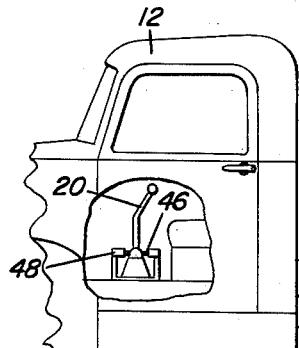
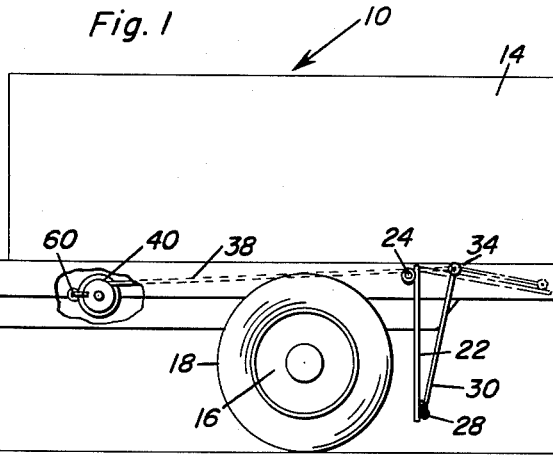
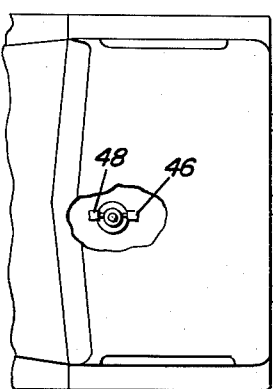
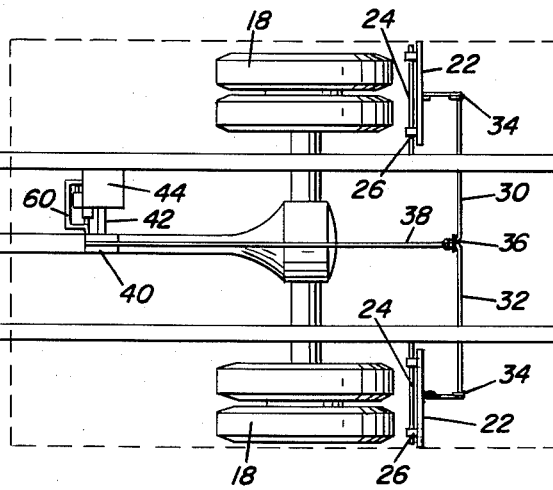
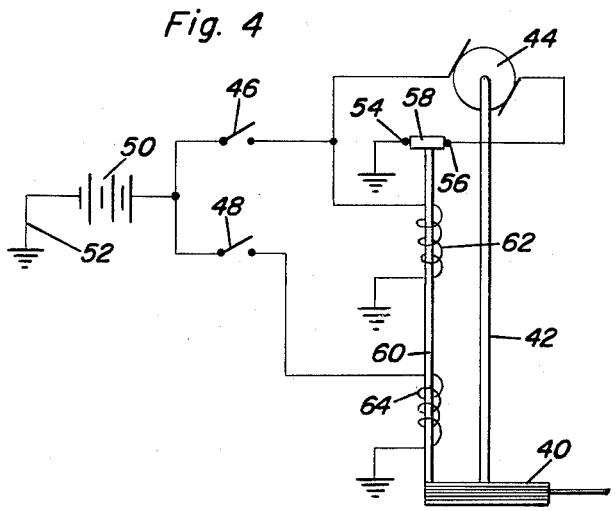
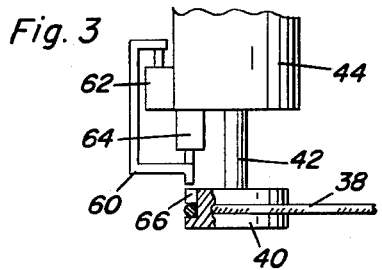
John L. Zerbe, Sr.
INVENTOR.

United States Patent Office 2,981,553
Patented Apr. 25, 1961

2,981,553

AUTOMATIC TRUCK FLAP SYSTEM

John L. Zerbe, Sr., R.D. 1, Denver, Pa.

Filed June 30, 1959, Ser. No. 824,078

4 Claims. (Cl. 280—154.5)

This invention relates generally to truck equipment and more particularly to an automatic flap system for moving the flaps behind the rear wheels out of the way when the vehicle is put in reverse gear.

Large trucks generally utilize flaps behind the rear truck wheels in order to shield automobiles driving behind the trucks from the mud, stones, etc., which are thrown rearwardly by the truck wheels. Though the use of the flaps is necessary, truckers often find that when the truck is used in loose ground, a rearward movement of the truck in the gravel, as by backing up to a platform, tears the flaps as they contact the tires. Also, flaps often tear when they are subjected to the weight of frozen snow which gathers thereon and hangs therefrom. Although the drawings comprising a portion of this application specifically illustrate only a dump truck, the invention contemplates means for moving the flaps out of the way of the rear tires in combination with tractor trailers, trailer trucks, buses, etc.

It is the principal object of this invention to provide an automatic flap system for trucks which enables the truck flaps to be automatically moved out of the way of the rear tires when the vehicle is placed in reverse gear. The teachings of the invention may be readily used with automatic or standard gear shifts.

It is a further object of this invention to provide a novel truck flap system which may be easily installed in existing trucks or installed as new equipment in yet to be built vehicles. The system is simple in construction and accordingly inexpensive to install and operate while being reliable and durable.

It is a more particular object of this invention to provide a truck flap system wherein flaps are pivotally mounted behind the rear truck wheels. Each of the truck flaps has a cable attached thereto proximate the free end thereof so that the truck flaps may be pivoted out of the way of the rear wheels when the cables are pulled. The cables extend through a centrally located eye on the truck to a single cable which is attached to a pulley driven by a motor. Switches are associated with the truck gear shift lever so that when the lever is placed in the reverse gear position, the motor is energized to rotate the pulley to pull the flaps upwardly. Also associated with the switch and actuated when the lever is placed in reverse is a first solenoid coil wound about an armature which draws the armature into a notch formed in the pulley for preventing the pulley from reverse movement as long as the gear shift lever is in reverse. The movement of the armature opens the circuit to the motor. When the lever is placed in forward gear, a solenoid coil acts on the armature to draw the armature out of the notch in the pulley so as to enable the flaps to assume their normal vertical position as they are drawn downwardly by gravity.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a fragmentary side elevational view of a conventional dump truck illustrating the automatic flap system used in conjunction therewith;

Figure 2 is a fragmentary elevational bottom view of the truck;

Figure 3 is an enlarged fragmentary elevational view partially broken away of the motor, armatures, solenoids, and pulleys; and Figure 4 is a schematic wiring diagram illustrating the electric circuitry used in conjunction with the invention.

With continuing reference to the drawings, the numeral 10 generally represents a conventional dump truck having a cab portion 12 and a dump body 14. The truck is supported on front wheels (not shown) and rear wheels 16 having tires 18 thereon. Within the cab 12 is a gear shift lever 20 which is connected to the truck transmission for operating the gears thereof. Conventionally, flaps are suspended from the truck body rearwardly of the rear truck wheels to prevent mud and stones from being thrown against trailing cars by the rear wheels. Generally, the flaps are merely suspended freely and therefore when the truck 10 is travelling in loose ground or gravel in reverse, the flaps are often torn by coming in contact with the rear tires 18.

In order to prevent the conventional flaps from contacting the rear tires 18, the present invention provides for the pivotal mounting of flaps 22 from the truck body at pivot axis 24 rearwardly of the rear tires 18. Apertured ears 26 may be fixed to the flaps 22 and receive the pivot axis 24 therethrough. An eye 28 is fixed to the flap 22 proximate the free end thereof remote from the pivot axis 24. Cables 30 and 32 respectively extend to the flaps mounted behind the sets of rear tires 18. The cables 30 and 32 extend from the eyes 28 in the flaps 22, through eyes 34 mounted on the truck frame, and through eye 36 centrally mounted to receive both cables 30 and 32 therethrough. The cables 30 and 32 are there joined and fixed to a single cable 38 which is in turn attached to a pulley 40 mounted on the shaft 42 of a motor 44. Accordingly, it will be apparent that upon rotation of the shaft 42, when driven by the motor 44, the pulley 40 will turn so as to pull the cable 38 through the eye 36 and accordingly pull each of the cables 30 and 32 through the eyes 34 so as to carry the flaps 22 upwardly to the dotted line position indicated in Figure 1.

In order to render the system automatic, control means for the motor 44 are provided. Initially, a first switch 46 which is normally open is mounted in the cab 12 adjacent the gear shift lever 20 in a position whereby the lever 20 will close the normally open switch 46 upon being placed in reverse. A switch 48 is also mounted in the cab 12 adjacent the shift lever 20 for being closed when the gear shift lever 20 is placed in forward gear. The truck battery 50 is connected to ground at 52 and electrically connected to the switches 46 and 48. The circuit for providing power to the pulley 40 extends from the battery 50 and through the normally open reverse switch 46, through the motor 44, and across a pair of contacts 54 and 56 which are normally bridged by bridging bar 58. Contact 54 is grounded as illustrated. It will be apparent therefore that when the reverse switch 46 is closed, and when the contacts 54 and 56 operate, the motor 44 will be energized to rotate the pulley 40. The bridging bar 58 is carried by an armature 60 associated with a first solenoid coil 62 and a second solenoid coil 64. The solenoid coils 62 and 64 are wound oppositely to move the armature 60 in different directions.

The first solenoid coil 62 forms part of a first solenoid control circuit which extends from the battery 50, through the normally open reverse switch 46 and through the first solenoid coil 62 to ground. The second solenoid control circuit extends from the battery 50, through the normally open forward switch 48, and through the second solenoid coil 64.

The armature 60 has a portion thereof aligned with the groove 66 defined in the pulley 40. When the armature 60 is engaged in the notch 66, the pulley 40 is prevented from rotation.

In the operation of the flap system, when the gear shift lever 20 is placed in reverse, the switch 46 is closed and the motor 44 energized through the normally bridged contacts 54 and 56. The first solenoid coil 62 will also be energized and tend to pull the armature 60 downwardly into the notch 66. However, since the notch 66 is particularly positioned in one place along the circumference of the pulley 40, the armature will be prevented from entering the notch until the pulley 40 is turned sufficiently so that the cable 38 pulls the flaps 22 to the full upward position illustrated in dotted lines in Figure 1. When the notch becomes aligned with the armature, the armature is drawn into the notch carrying the bridging bar 58 out of bridging relationship with the contacts 54 and 56. With the armature 60 engaged in the notch 66, the flaps 22 are prevented from resuming their vertical position. When the gear shift 20 is then moved to the forward position, forward switch 48 will be closed and rear switch 46 opened so that the second solenoid coil 64 will be energized to draw the armature 60 out the notch 66 to allow the flaps, carried by gravitational forces to pull the cable 38 and pulley 40 so that the flaps 22 resume their vertical position and contacts 54 and 56 become bridged.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An automatic flap system for a truck having a gear shift lever comprising flaps pivotally secured to said truck, a cable attached to said flaps proximate the free end thereof for pivoting said flaps and means for automatically controlling said cable, said means including a pulley having the cable attached thereto and power means for selectively rotating said pulley, said power means including a series electrical circuit having a motor, an energy source for driving said motor, a normally open reverse switch and a pair of normally bridged contacts, said normally open reverse switch including an actuator disposed adjacent said lever and engageable therewith when said lever is placed in a reverse position, said normally bridged contacts being bridged by a bridging bar carried by an armature, a notch formed in said pulley, and means operatively connecting said shift lever and said armature for engaging said armature in said notch in response to disposing said lever in a reverse position.

2. An automatic flap system for a truck having a gear shift lever comprising flaps pivotally secured to said truck, a cable attached to said flaps proximate the free end thereof for pivoting said flaps and means for automatically controlling said cable, said means including a pulley having the cable attached thereto and power means for selectively rotating said pulley, said power means including a series electrical circuit having a motor, an energy source for driving said motor, a normally open reverse switch and a pair of normally bridged contacts, said normally open reverse switch including an actuator disposed adjacent said lever and engageable therewith when said lever is placed in a reverse position, said normally bridged contacts being bridged by a bridging bar carried by an armature, a notch formed in said pulley, and means operatively connecting said shift lever and said armature for engaging said armature in said notch in response to disposing said lever in a reverse position, and means disengaging said armature and said notch in response to disposing said lever in a forward position.

3. The combination of claim 1 wherein said bridging bar is carried out of bridging relationship with said normally bridged contacts when said armature is engaged in said notch.

4. An automatic flap system for a truck having a gear shift lever comprising flaps pivotally secured to said truck, a cable attached to said flaps proximate the free end thereof for pivoting said flaps and means for automatically controlling said cable, said means including a pulley having the cable attached thereto and power means for selectively rotating said pulley, said power means including a series electrical circuit having a motor, an energy source for driving said motor, a normally open reverse switch and a pair of normally bridged contacts, said normally open reverse switch including an actuator disposed adjacent said lever and engageable therewith when said lever is placed in a reverse position, said normally bridged contacts being bridged by a bridging bar carried by an armature, a first solenoid control circuit including a first solenoid coil connected in series with said normally open reverse switch and said source, said first solenoid coil disposed proximate said armature for moving said armature in one direction in response to the energization thereof, a second solenoid control circuit including a second solenoid coil connected in series with said source, a normally open forward switch connected between said second solenoid coil and said source, said second solenoid coil disposed proximate said armature for moving said armature opposite to said first solenoid coil, said normally open forward switch including an actuator disposed adjacent said lever and engageable therewith when said lever is placed in a forward position, a notch formed in said pulley, said first solenoid coil adapted to draw said armature into said notch and said bridging bar out of bridging relationship with said contacts, said second solenoid coil adapted to draw said armature out of said notch.

References Cited in the file of this patent

UNITED STATES PATENTS

| | | |
|---|---|---|
| 2,588,815 | Fasolino | Mar. 11, 1952 |
| 2,653,846 | Wiley | Sept. 29, 1953 |
| 2,721,760 | Lapham et al. | Oct. 25, 1955 |
| 2,857,200 | Hoppesch | Oct. 21, 1958 |

FOREIGN PATENTS

| | | |
|---|---|---|
| 533,320 | Italy | Sept. 21, 1955 |